United States Patent
Pondugula et al.

(10) Patent No.: US 12,463,880 B2
(45) Date of Patent: Nov. 4, 2025

(54) SYSTEMS AND METHOD FOR VISUALIZING AND ANALYZING OPERATIONAL INTERACTIONS OF MICROSERVICES

(71) Applicant: JPMORGAN CHASE BANK, N.A., New York, NY (US)

(72) Inventors: Vishnuvardhan Pondugula, Garnet Valley, PA (US); Anupam Arora, Middletown, DE (US); Raghu Vudathu, Downingtown, PA (US); Howard Spector, Street, MD (US); Mizan Miah, Wilmington, DE (US); Ashok Reddy, Newark, DE (US); Arun Subramanian, Newark, DE (US); Lee Polisano, Haddon Heights, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 19 days.

(21) Appl. No.: 18/525,284

(22) Filed: Nov. 30, 2023

(65) Prior Publication Data
US 2025/0184244 A1    Jun. 5, 2025

(51) Int. Cl.
*H04L 43/045* (2022.01)
*H04L 41/50* (2022.01)

(52) U.S. Cl.
CPC ........ *H04L 43/045* (2013.01); *H04L 41/5058* (2013.01)

(58) Field of Classification Search
None
See application file for complete search history.

(56) References Cited

U.S. PATENT DOCUMENTS

| | | | | |
|---|---|---|---|---|
| 11,080,164 | B2 * | 8/2021 | Raviv | G06F 21/6254 |
| 11,206,205 | B1 * | 12/2021 | Gupta | H04L 41/0893 |
| 11,250,069 | B1 * | 2/2022 | Bianchi | G06F 16/9038 |
| 11,263,267 | B1 * | 3/2022 | Zittel | G06F 16/2237 |
| 11,321,217 | B1 * | 5/2022 | Agarwal | G06F 11/3082 |
| 11,347,622 | B1 * | 5/2022 | Agarwal | G06F 3/0482 |
| 11,388,211 | B1 * | 7/2022 | Breeden | G06F 16/24568 |
| 11,392,605 | B1 * | 7/2022 | Baskaran | G06F 16/254 |

(Continued)

*Primary Examiner* — Ranodhi Serrao
(74) *Attorney, Agent, or Firm* — GREENBERG TRAURIG LLP (57) ABSTRACT

Systems and methods for visualizing and analyzing operational interactions of microservices are disclosed. A method for visualizing operational interactions of microservices may include: (1) calling, by a source microservice, a target microservice with a request, both the source microservice and the target microservice being in a plurality of microservices; (2) logging, by the source microservice, an event; (3) recording, by a blockchain building program, the event to a blockchain as a table and as an index; (4) receiving, by a microservices tracing computer program, the request; (5) processing, by the target microservice, the request with a tracer; (6) returning, by the target microservice, a microservice identity for the target microservice with requested data; (7) logging, by the microservices tracing computer program, the requested data using the tracer; and (8) generating, by the microservices tracing computer program, a visualization of microservice interactions from the requested data.

18 Claims, 3 Drawing Sheets

(56) References Cited

U.S. PATENT DOCUMENTS

| | | | | |
|---|---|---|---|---|
| 11,616,713 | B2* | 3/2023 | Gupta | H04L 41/0894 |
| | | | | 709/220 |
| 2021/0081271 | A1* | 3/2021 | Doshi | G06F 21/53 |
| 2022/0116302 | A1* | 4/2022 | Gupta | H04L 41/0895 |
| 2022/0121628 | A1* | 4/2022 | Devaraj | G06F 11/323 |
| 2022/0247784 | A1* | 8/2022 | Satish | H04L 63/0281 |
| 2022/0277042 | A1* | 9/2022 | Bianchi | G06F 16/9035 |
| 2022/0309105 | A1* | 9/2022 | Zittel | G06F 11/302 |
| 2024/0143471 | A1* | 5/2024 | Martella | H04L 41/069 |

* cited by examiner

SYSTEMS AND METHOD FOR VISUALIZING AND ANALYZING OPERATIONAL INTERACTIONS OF MICROSERVICES

BACKGROUND OF THE INVENTION

1. Field of the Invention

Embodiments generally relate to systems and methods for visualizing and analyzing operational interactions of microservices.

2. Description of the Related Art

It is commonplace to see the use of microservices in distributed environments. Despite this, it is difficult to know the various inbound and outbound calls associated with a group of microservices.

SUMMARY OF THE INVENTION

Systems and methods for visualizing and analyzing operational interactions of microservices are disclosed. According to an embodiment, a method for visualizing operational interactions of microservices may include: (1) calling, by a source microservice, a target microservice with a request, both the source microservice and the target microservice being in a plurality of microservices; (2) logging, by the source microservice, an event; (3) recording, by a blockchain building program, the event to a blockchain as a table and as an index; (4) receiving, by a microservices tracing computer program, the request; (5) processing, by the target microservice, the request with a tracer; (6) returning, by the target microservice, a microservice identity for the target microservice with requested data; (7) logging, by the microservices tracing computer program, the requested data using the tracer; and (8) generating, by the microservices tracing computer program, a visualization of microservice interactions from the requested data.

In one embodiment, the method may also include: calling, by the source microservice, an active directory federation service for an access token, wherein the active directory federation service may be configured to generate the access token; and receiving, by the source microservice, the access token from the active directory federation service. The source microservice may provide the access token with the request to the target microservice.

In one embodiment, the access token may be signed by the active directory federation service.

In one embodiment, the target microservice may be configured to validate the access token and return a target microservice identity token to the source microservice.

In one embodiment, the microservices tracing computer program logs the requested data to the blockchain.

In one embodiment, the method may also include injecting, by the microservices tracing computer program, the tracer into the request.

In one embodiment, the tracer may include an identifier.

In one embodiment, the method may also include generating, by the microservices tracing computer program, a dashboard comprising point-to-point interactions among the source microservice, the target microservice, and other microservices based on the tracer and the logged event and the logged requested data.

In one embodiment, the method may also include generating, by the microservices tracing computer program, a visualization of point-to-point interactions visualizing transaction types and rates of transactions for a selected microservice in the plurality of microservices in a time period, a latency rate for the selected microservice, a success or failure for a transaction, and/or traffic in a specific region in the time period.

In one embodiment, the microservices tracing computer program may log the requested data with a response status, a timestamp, a type of the request, and/or an API path for restful services.

According to another embodiment, a system may include: a computer system executing a plurality of microservices including a source microservice and a target microservice; an electronic device executing a microservices tracing computer program; a blockchain building computer program; and a blockchain. The source microservice may be configured to call a target microservice with a request and to log an event; a blockchain building program may be configured to log the event to a blockchain as a table and as an index; the microservices tracing computer program may be configured to receive the request, to process the request with a tracer; the target microservice may be configured to return a microservice identity for the target microservice with requested data; and the microservices tracing computer program may be configured to log the requested data using the tracer and to generate a visualization of microservice interactions from the requested data.

In one embodiment, the system may also include an active directory federation service, and wherein the source microservice may be configured to call the active directory federation service for an access token, the active directory federation service may be configured to generate the access token, the source microservice may be configured to receive the access token from the active directory federation service, and the source microservice may be configured to provide the access token with the request to the target microservice.

In one embodiment, the active directory federation service may be configured to sign the access token.

In one embodiment, the target microservice may be configured to validate the access token and return a target microservice identity token to the source microservice.

In one embodiment, the microservices tracing computer program may be configured to log the requested data to the blockchain.

In one embodiment, the microservices tracing computer program may be configured to inject the tracer into the request.

In one embodiment, the tracer may include an identifier.

In one embodiment, the microservices tracing computer program may be configured to generate a dashboard comprising point-to-point interactions among the source microservice, the target microservice, and other microservices based on the tracer and the logged event and the logged requested data.

In one embodiment, the microservices tracing computer program may be configured to generate a visualization of point-to-point interactions visualizing transaction types and rates of transactions for a selected microservice in the plurality of microservices in a time period, a latency rate for the selected microservice, a success or failure for a transaction, and/or traffic in a specific region in the time period.

In one embodiment, the microservices tracing computer program may be configured to log the requested data with a response status, a timestamp, a type of the request, and/or an API path for restful services.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments generally relate to systems and methods for visualizing and analyzing operational interactions of microservices and other elements within a computer network. Embodiments may provide information regarding which microservice calls are successful, which are failing, the latency between interactions, the geographical location of originating calls and received calls, etc. In embodiments, records of these interactions may be idempotent and cannot be modified or tampered with, and may be presented as conclusive evidence of end-to-end customer interactions.

Embodiments may inject a tracer, such as a data product element, a composite element, a digital signature, a Universal Unique Identifier (UUID), a block ledger, a geographic boundary, etc.) into a process. The tracer, along with other configurable inputs, such as a service name, may be used to create a dashboard showing various point-to-point interactions between the microservices and other elements within the computer system and to analyze the various interactions between the services.

In embodiments, artificial intelligence and/or machine learning may be used to predict interactions between microservices and other elements within the computer system.

Figure 1:
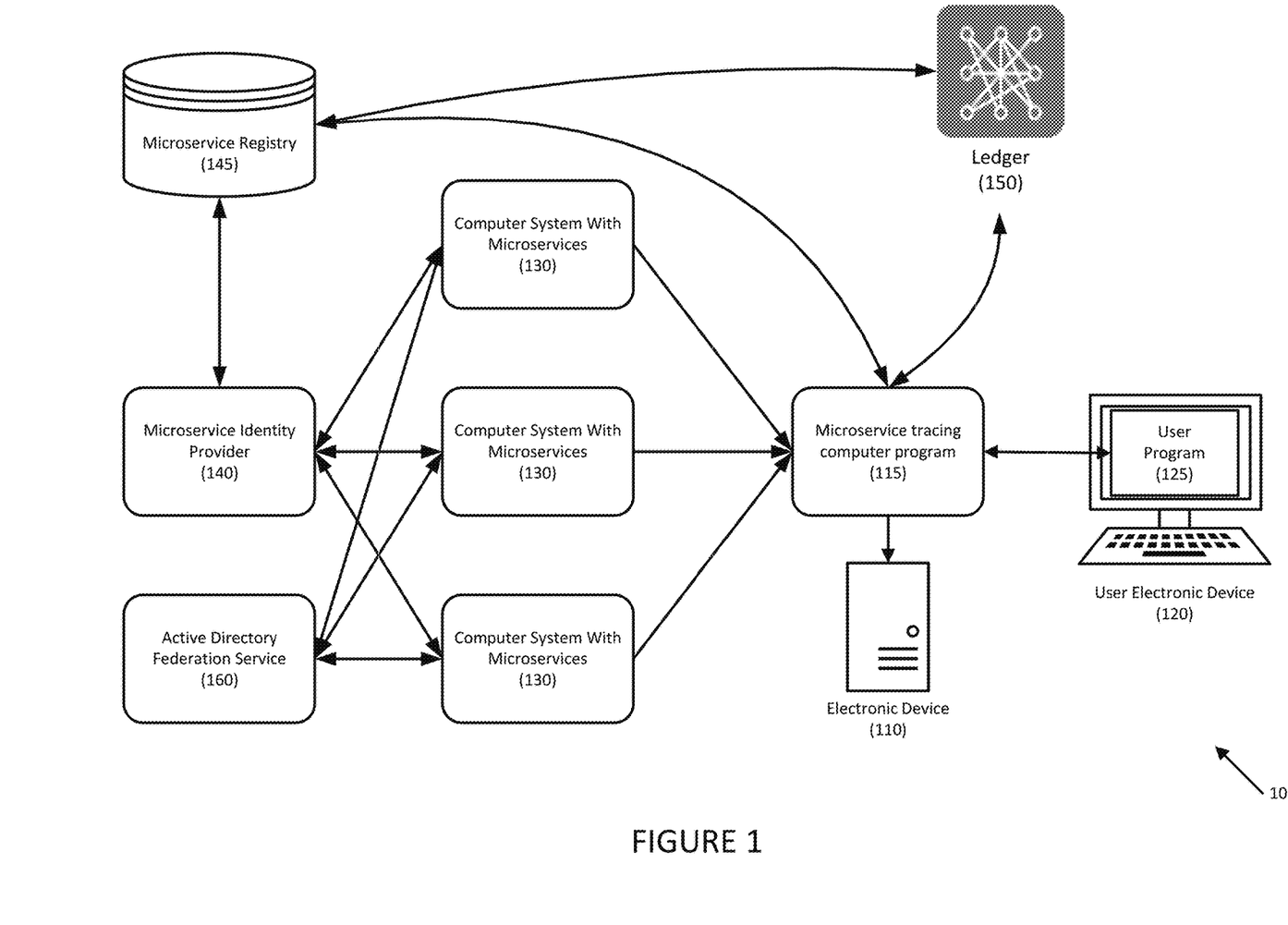
FIG. 1 depicts a system for visualizing and analyzing operational interactions of microservices according to an embodiment.

FIG. 1 depicts a system for visualizing and analyzing operational interactions of microservices according to an embodiment. System 100 may include electronic device 110 which may be a server (e.g., physical and/or cloud-based), computer (e.g., workstation, desktop, laptop, notebook, tablet, etc.), etc. that may execute microservice tracing computer program 115. Microservice tracing computer program 115 may receive data, such as logs, events, etc. from computer systems 130 and may record such data. Computer systems 130 may include microservices, hardware, etc.

Each microservice may have a microservice identity. For example, the microservice identities may be unique to the microservice, may identify the microservice's taxonomy (e.g., microservice information, business unit, application identifier, domain/subdomain/context, etc.), may be attached permanently to the microservice, cannot be tampered, and is verifiable.

In one embodiment, microservice identity provider 140 may provide each microservice with the microservice identity. For example, each microservice may register with microservice identity provider 140 and may provide its taxonomy. Microservice identity provider 140 may create a JSON Web Token (JWT) including the microservice taxonomy and may sign the JWT. Microservice identity provider 140 may return the JWT to the microservice, and may also hold the information in microservice registry 145.

Microservice identity provider 140 may use a hierarchy to prevent collisions. For example, the hierarchy may be based on the business unit, application identifier, domain, subdomain, context root, microservice name.

In one embodiment, the microservice identity may be a hash value. For example, a short 32 byte microservice identity may be created by performing a cryptographic hash (e.g., a SHA-256) of the JWT. This may be useful in logs and may be captured in ledger 150.

Ledger 150 may receive and store microservice identities and may store a log of events involving the microservices. Ledger 150 may be a blockchain-based ledger.

Microservice tracing computer program 115 may interface with user program 125 that may be executed by user electronic device 120. User electronic device 120 may be a computer, a smart device, an Internet of Things (IoT) appliance, etc. Microservice tracing computer program 115 may generate visualizations of the interconnections between microservices and other computer hardware.

In one embodiment, user electronic device 120 may provide access to the metaverse, and the visualizations may be presented to the user in the metaverse.

System 100 may further include active directory federation service 160 that may provide a method for the target microservice to authenticate and authorize that specific transaction from the source microservice. For example, active directory federation service 160 may receive an interaction from a source microservice and may issue an access token to the source microservice. It may also sign the access token.

Figure 2:
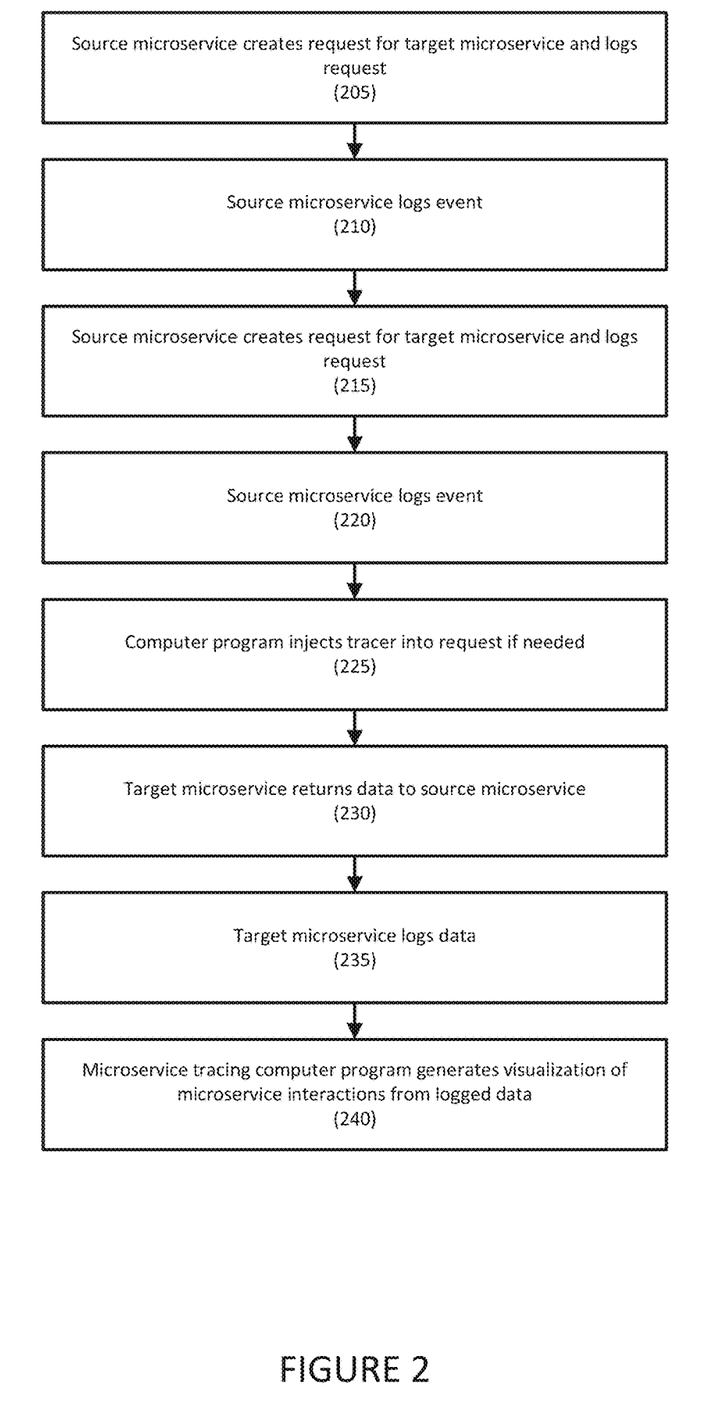
FIG. 2 depicts a method for visualizing and analyzing operational interactions of microservices according to an embodiment.

Referring to FIG. 2, a method for visualizing and analyzing operational interactions of microservices is disclosed according to an embodiment.

In step 205, a source microservice may call an active directory federation service for an access token. The request may include custom claims about the client, the users of the application, the line of business, an application identifier, a domain, a subdomain, a context, etc.

In step 210, the active directory federation service may generate and provide the access token to the source microservice. The access token may include the custom claims and may be signed by the active directory federation service.

The access token may include the microservice identity or the microservice identity may be looked up as is necessary and/or desired. It may provide irrefutable evidence about the identity of source microservice and the target microservice based on the client and audience claims inside the token.

In step 215, the source microservice may call a target microservice with a request. For example, the source microservice may retrieve the microservice identity for the target microservice from a microservice registry and may include that in the request.

The request may also include the access token, which may be included in an authorization header or an event header. The target microservice may validate the access token as usual, and may return its identity token to the target microservice.

In step 220, the source microservice may log an event. For example, the source microservice may log an event (1) when it sends the request to target, (2) when it receives the response from target, and (3) when it times out waiting for the response. For example, the source microservice may log its microservice identity, the name of the queue/topic (in case of events), the microservice identity of the target microservice, the response status received or if the response timed out, the timestamp of the request, the timestamp of the response, the infrastructure type of target (e.g., GAIA, cloud-based, GCP, virtual machine, etc.), the region of infrastructure, the type of request (e.g., HTTP, Queue, Topic, etc.), the API path for Restful services, etc. In one embodiment, the source microservice may log the event to a messaging service, such as Kafka.

A blockchain building program may record the event to the blockchain. In one embodiment, the blockchain building program may listen to the messaging service and may record the event to the blockchain. For example, tables and indexes may be created so that the data in the blockchain may be easily queried. Examples of such tables may include an invocation sequence table (e.g., a ledger that records the events logged by each microservice for a given sequence of invocation. It may be indexed by a trace identifier that may be assigned to that sequence), a microservice events history table (e.g., a table that records events for a given microservice and is indexed by the microservice identity. The trace id from this table may be used to fetch the complete sequence from the Invocation Sequence table), etc.

In step 225, a computer program, such as a microservices tracing computer program may receive the request and may review the header of the request to determine if a tracer is already present before injecting the tracer. For example, the microservice tracing computer program may intercept the request as it is being passed. If the tracer is present, the microservices tracing computer program may pass the same tracer to the target microservice.

If the header does not include the tracer, the microservices tracing computer program may inject a tracer, which may include the target microservice identity, into the request.

In step 230, the target microservice may receive the request and may process the request. The target microservice may then return data to the source microservice and/or the microservice tracing computer program. For example, the microservices and hardware may return a microservice identity for the target microservice with the requested data.

In step 235, the microservice tracing computer program may log the data. For example, the microservice tracing computer program may log the data with the queue/topic, whether a response status received or timed out, a timestamp of the request, a timestamp of a response, an infrastructure type of target (e.g., a cloud provider, a virtual machines, etc.), a region of infrastructure, a type of request (e.g., HTTP, Queue, Topic, etc.), an API path for restful services, a name of a queue/topic in case of events, etc.

In one embodiment, the target microservice may log the event by submitting the event to the messaging queue. The blockchain building program may record the event to the blockchain.

In step 240, the microservice tracing computer program may generate visualizations of microservice interactions from the data, such as the data that has been recorded to the blockchain. For example, the microservice tracing computer program may generate transaction types and rate of transactions for a given microservice in a given time period, latency rates, success/failure for given transactions or a microservice in a given time period, traffic on various infrastructure type in a given time period, traffic in specific region in a given time period, etc.

The visualizations may be presented on a screen in two dimensions, in the metaverse in three dimensions, etc.

Examples of visualizations may include transaction types and rates of transactions for a given microservice in a given time period; latency rates, success/failure for given transactions or a microservice in a given time period; traffic on various infrastructure type in a given time period; traffic in specific region in a given time period; etc.

In one embodiment, the data may be retrieved from the blockchain. The data may be augmented with additional information, such as latency, traffic, etc., from other sources as is necessary and/or desired.

Figure 3:
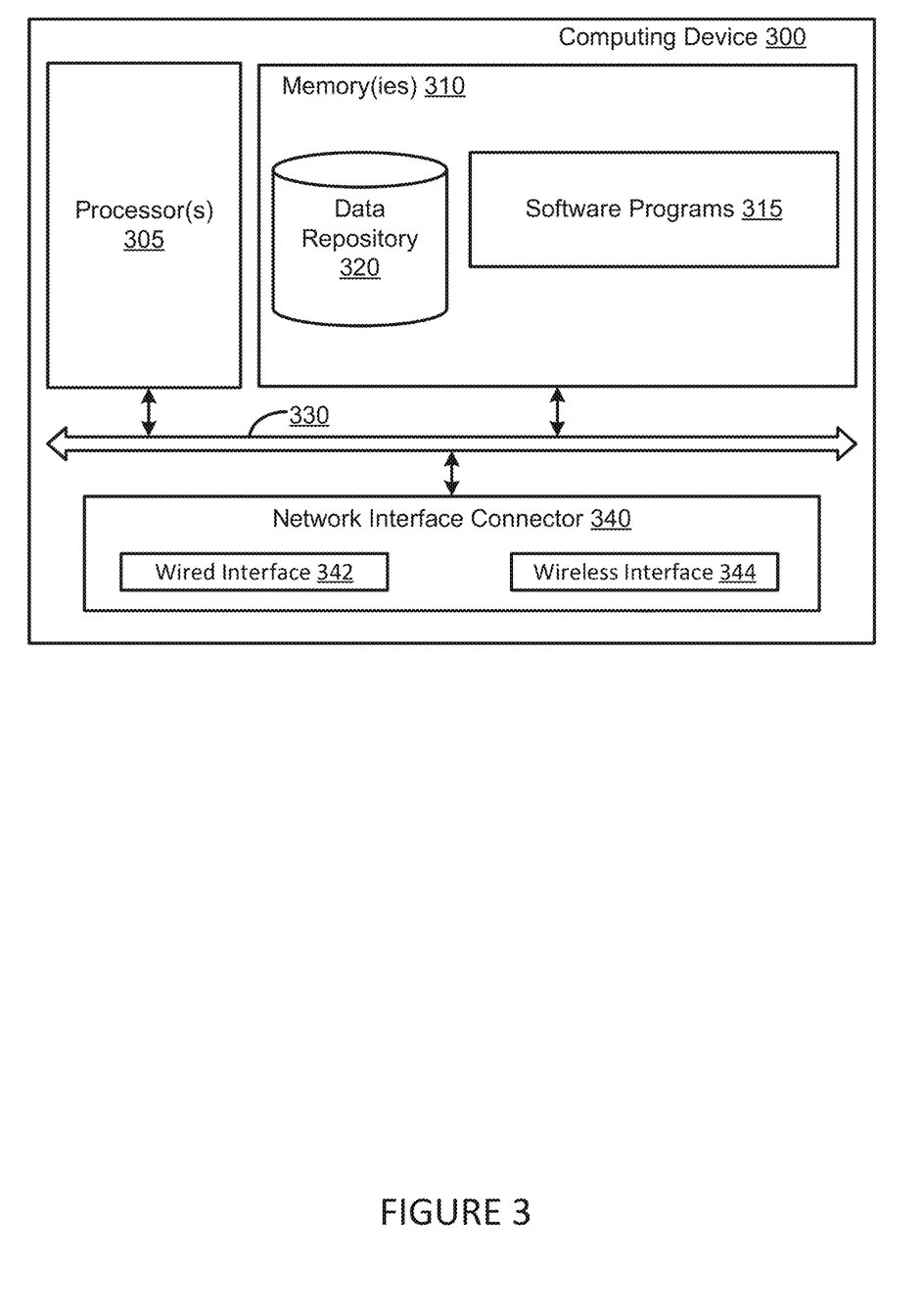
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for visualizing and analyzing operational interactions of microservices, comprising:
    calling, by a source microservice, an active directory federation service for an access token, wherein the active directory federation service is configured to generate the access token;
    receiving, by the source microservice, the access token from the active directory federation service;
    calling, by the source microservice, a target microservice with a request and the access token, both the source microservice and the target microservice being in a plurality of microservices;
    logging, by the source microservice, an event;
    recording, by a blockchain building program, the event to a blockchain as a table and as an index;
    receiving, by a microservices tracing computer program, the request;
    processing, by the target microservice, the request with a tracer;
    returning, by the target microservice, a microservice identity for the target microservice with requested data;
    logging, by the microservices tracing computer program, the requested data using the tracer; and
    generating, by the microservices tracing computer program, a visualization of microservice interactions from the requested data.

2. The method of claim 1, wherein the access token is signed by the active directory federation service.

3. The method of claim 1, wherein the target microservice is configured to validate the access token and return a target microservice identity token to the source microservice.

4. The method of claim 1, wherein the microservices tracing computer program logs the requested data to the blockchain.

5. The method of claim 1, further comprising:
    injecting, by the microservices tracing computer program, the tracer into the request.

6. The method of claim 1, wherein the tracer comprises an identifier.

7. The method of claim 1, further comprising:
    generating, by the microservices tracing computer program, a dashboard comprising point-to-point interactions among the source microservice, the target microservice, and other microservices based on the tracer and the logged event and the logged requested data.

8. The method of claim 7, further comprising:
    generating, by the microservices tracing computer program, a visualization of point-to-point interactions visualizing transaction types and rates of transactions for a selected microservice in the plurality of microservices in a time period, a latency rate for the selected microservice, a success or failure for a transaction, and/or traffic in a specific region in the time period.

9. The method of claim 1, wherein the microservices tracing computer program logs the requested data with a response status, a timestamp, a type of the request, and/or an API path for restful services.

10. A system, comprising:
    a computer system comprising a computer system computer processor executing a plurality of microservices including a source microservice and a target microservice;
    an electronic device comprising an electronic device computer processor executing a microservices tracing computer program;
    an active directory federation service;
    a blockchain building computer program executed by a computer processor; and
    a blockchain maintained by a server executed by a server computer processor;
    wherein:
        the source microservice is configured to call the active directory federation service for an access token;
        the active directory federation service is configured to generate the access token;
        the source microservice is configured to receive the access token from the active directory federation service;
        the source microservice is configured to call the target microservice with a request and the token and to log an event;
        a blockchain building program that is configured to log the event to a blockchain as a table and as an index;
        the microservices tracing computer program is configured to receive the request, to process the request with a tracer;
        the target microservice is configured to return a microservice identity for the target microservice with requested data; and
        the microservices tracing computer program is configured to log the requested data using the tracer and to generate a visualization of microservice interactions from the requested data.

11. The system of claim 10, wherein the active directory federation service is configured to sign the access token.

12. The system of claim 10, wherein the target microservice is configured to validate the access token and return a target microservice identity token to the source microservice.

13. The system of claim 10, wherein the microservices tracing computer program is configured to log the requested data to the blockchain.

14. The system of claim 10, wherein the microservices tracing computer program is configured to inject the tracer into the request.

15. The system of claim 10, wherein the tracer comprises an identifier.

16. The system of claim 10, wherein the microservices tracing computer program is configured to generate a dashboard comprising point-to-point interactions among the source microservice, the target microservice, and other microservices based on the tracer and the logged event and the logged requested data.

17. The system of claim 16, wherein the microservices tracing computer program is configured to generate a visualization of point-to-point interactions visualizing transaction types and rates of transactions for a selected microservice in the plurality of microservices in a time period, a latency rate for the selected microservice, a success or failure for a transaction, and/or traffic in a specific region in the time period.

18. The system of claim 10, wherein the microservices tracing computer program is configured to log the requested data with a response status, a timestamp, a type of the request, and/or an API path for restful services.

\* \* \* \* \*